Patented Apr. 17, 1951

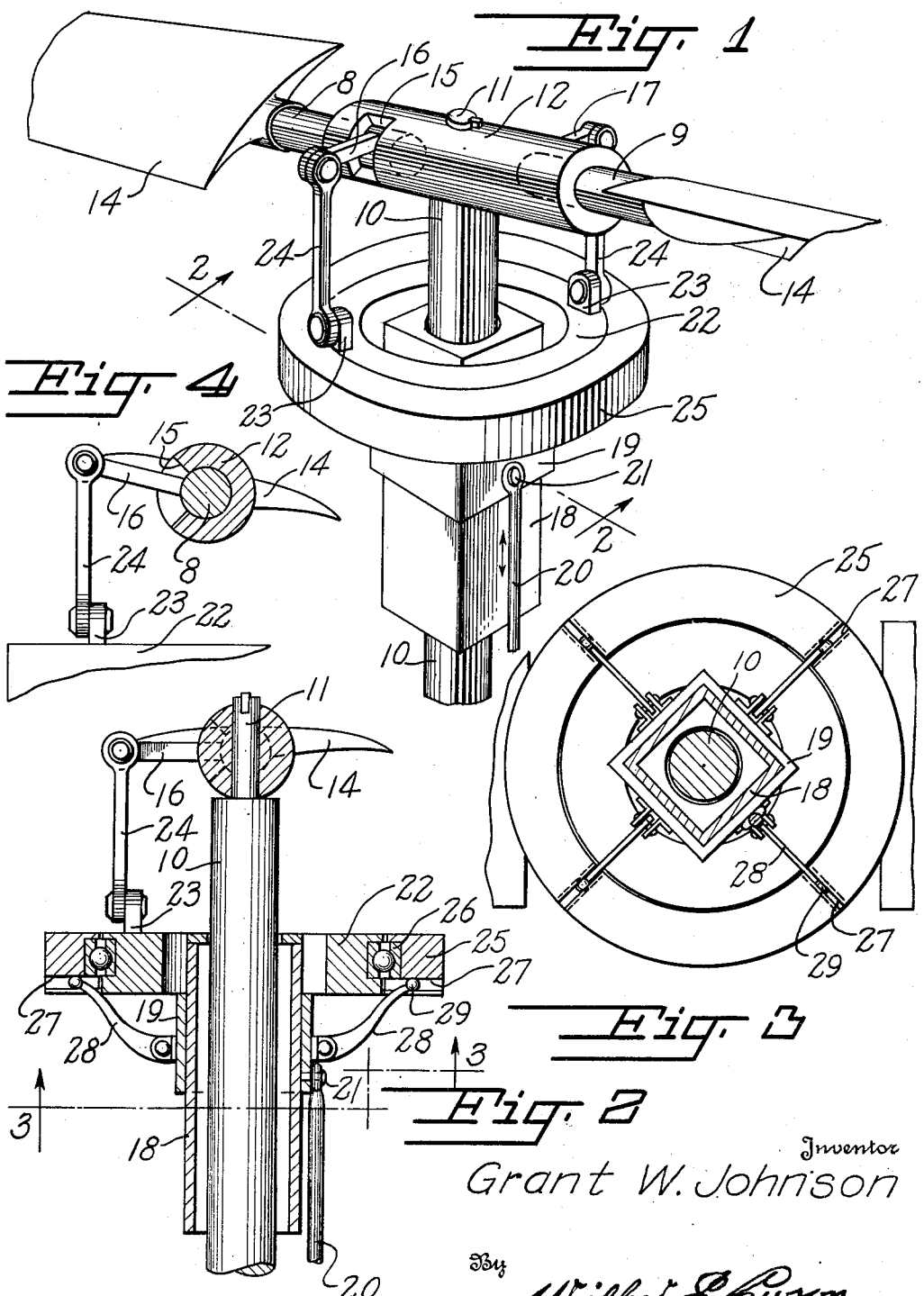

2,549,313

UNITED STATES PATENT OFFICE 2,549,313

CHANGEABLE PITCH PROPELLER

Grant W. Johnson, Lincoln, Ill.

Application November 1, 1948, Serial No. 57,645

2 Claims. (Cl. 170—160.46)

This invention relates to a helicopter, and more particularly to an assembly for controlling the pitch of the helicopter rotor.

The object of the invention is to provide an assembly which will facilitate the varying of the pitch of a helicopter rotor.

Another object of the invention is to provide an assembly for controlling the pitch of a helicopter rotor which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a perspective view of the assembly for controlling the pitch of a helicopter rotor according to the present invention;

Figure 2 is a sectional view taken on the line 2—2 of Figure 1;

Figure 3 is a sectional view taken on the line 3—3 of Figure 2;

Figure 4 is a sectional view showing certain constructional details thereof.

Referring in detail to the drawings, the numeral 10 designates a drive shaft which is rotated by a suitable power source, not shown, in the helicopter. The upper end of the shaft is reduced in diameter, as at 11, and extends transversely through a tubular sleeve 12 and is keyed to the latter. Rotatably supported in each end of the sleeve 12 is a rod 8 and 9 and the projecting end of each of the rods has mounted thereon a blade 14. A pair of spaced slots 15 are arranged in the sleeve 12 and projecting through each of the slots 15 and secured to the rods 8 and 9, respectively, are links 16 and 17.

A square housing 18 is anchored to the helicopter and the housing 18 rotatably receives the shaft 10 therein. A square sleeve 19 is slidably mounted on the housing 18 and for causing sliding movement of the sleeve 19 a lever 20 is secured by a pin 21 thereto, and the lever 20 is adapted to be actuated from the helicopter cockpit.

Resting on the sleeve 19 is an annular support member 22 which has apertured lugs 23 projecting upwardly therefrom. A bar 24 has one end pivotally connected to each of the lugs 23 and its other end pivotally connected to the free ends of the links 16 and 17.

Arranged in embracing relation about the support member 22 is a ring member 25, there being a bearing race 26 interposed between the support member 22 and ring member 25 so that support member 22 can rotate freely within the ring member 25.

For preventing rotation of the ring member 25, there are a plurality of sockets 27 arranged in the bottom of the ring member 25. A plurality of arms 28 each have one end pivotally connected to the square sleeve 19 (Fig. 2). A pawl 29 is arranged on the other end of each of the arms 28 and is positioned in the socket 27.

In use, the drive shaft 10 rotates to thereby rotate the blades 14. To vary the pitch of the blades 14, the lever 20 is actuated to slidably move the sleeve 19 on which rests the support member 22. Thus, upward sliding movement of the sleeve 19 moves the support member 22 to thereby rotate the rods 8 and 9 and vary the pitch of the helicopter blades and the support member 22 rotates within the ring member 25.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a changeable pitch propeller, a drive shaft, a tubular cross-head mounted on the free end of said shaft, propeller blades having stub shafts at their inner ends engaged in the ends of said cross-head, said cross-head having circumferentially elongated slots formed therein, one adjacent each of its ends and at the side opposite from the other, arms secured to said stub shafts and projecting outwardly of said slots, a fixed housing engaged about said drive shaft, a sleeve slidably mounted on said housing, other arms projecting from opposite sides of said sleeve, a ball-race formed of inner and outer concentric annular members, lugs upstanding from the inner of said annular members, connecting rods having one of their ends pivotally connected with said lugs and their other ends pivotally connected with the first named arms, the outer of said annular members having recesses formed in its lower side and engaged by the outer ends of said other arms, and means depending from said sleeve for actuating the same to raise and lower said ball-race whereby to impart an oscillatory movement to said stub shafts to vary the pitch of said propeller blades.

2. The invention as defined in claim 1, with the said housing and said sleeve square in cross-section whereby the latter, the said other arms carried thereby, and the said outer annular member engaged by said other arms, are held against rotation, while the inner annular member rotates with the said drive shaft and relatively to the outer annular member.

GRANT W. JOHNSON.

REFERENCES CITED

The following references are of record in the file of this patent:

UNITED STATES PATENTS

| Number | Name | Date |
|---|---|---|
| 1,837,318 | Eustis | Dec. 22, 1931 |
| 1,852,499 | Zipay | Apr. 5, 1932 |
| 1,973,598 | Ballard et al. | Sept. 11, 1934 |
| 2,137,952 | Rothenhoefer | Nov. 22, 1938 |
| 2,256,635 | Young | Sept. 23, 1941 |
| 2,402,349 | Sikorsky | June 18, 1946 |
| 2,444,070 | Stanley | June 29, 1948 |